UNITED STATES PATENT OFFICE 22,978

FOOD PRODUCT

Gustavus J. Esselen, Swampscott, Mass.

No Drawing. Original No. 2,270,582, dated January 20, 1942, Serial No. 293,431, September 5, 1939. Application for reissue May 10, 1946, Serial No. 668,650

5 Claims. (Cl. 99—124)

This invention relates to the production of a bouillon or soup which can be supplied to the public in powdered form and therefore, as will be explained, has a utility that concentrated soup bases as previously marketed do not have. While having in general the flavor and appearance of soups made from animal materials, it may if desired be made wholly from vegetable substances.

Concentrated soup bases as heretofore made have had certain serious defects. Meat extracts usually have an extremely unpleasant odor which persists after being dissolved. Soup bases in jelly form, such as soup cubes, often have the same defect. Both deteriorate rapidly and must be kept refrigerated to prevent spoilage. Both are subject to rapid injury by bacterial action. They are also injured by drying out.

Accordingly my present invention provides a concentrated soup base which if desired can be made wholly without animal matter, which will remain stable and without deterioration, which can be kept without refrigeration, which can be readily dispersed in hot water and is thereby converted into a nourishing and palatable broth, soup or bouillon, and which may be made to simulate in appearance, consistency and flavor, a wide variety of soups, both meat and vegetable, prepared in the usual manner. The soup embodying my invention is in the form of a powder, and is, therefore, rapidly soluble, conveniently handled and stored without refrigeration, and is only slightly, if at all, subject to bacterial action. So far as is known to me, no soup or bouillon base complete in powdered form was available prior to this invention.

My invention is based on the discovery that the monosodium salt of glutamic acid (alpha amino glutaric acid) this being a product extracted particularly from wheat in certain manufacturing processes, can be combined with a thickening agent in dry powdered form and certain other agents to give it body or soup-like consistency and seasonings and that the resulting powder which is readily soluble in hot water forms a palatable nourishing soup having much the same food value as soups made in the kitchen from meats and vegetables. I am aware that monosodium glutamate has been used as a flavoring for certain products but I believe that I am the first to discover the possibility of combining it with thickening and seasoning materials to produce a complete soup base in powdered form.

The thickening agents employed are powdered edible starches or gums alone or in combination but gelatin may be used when there is no objection to the use of an animal product. Such materials are capable of being dissolved or dispersed in hot water. Seasoning materials such as salt, pepper, spices, etc., etc., also powdered edible coloring matters to give the desired color, are preferably added. These addition materials are chosen in accordance with the characteristics of the particular broth or soup which it is desired to produce or simulate.

The following formulas are illustrative of dry powders capable upon solution of producing soups having the characteristics indicated, although it is obvious that the particular addition agents, and their proportions, which are combined with the base material to produce the desired effects, can be widely varied.

1. A soup powder with a chicken flavor.

| | Parts by weight |
|---|---|
| Monosodium glutamate | 100 |
| Table salt | 86 |
| Ground black pepper | 0.8 |
| Ground celery seed | 1.7 |
| Edible locust bean gum | 6 |
| Tumeric | 0.6 |

2. A soup powder with a beef flavor.

| | Parts by weight |
|---|---|
| Monosodium glutamate | 100 |
| Table salt | 69 |
| Ground black pepper | 0.6 |
| Edible locust bean gum | 5 |
| Edible gelatine | 5 |
| Amaranth (certified food color) | 0.1 |
| Tartrazine (certified food color) | 0.1 |
| Brilliant Blue (certified food color) | 0.01 |

3. A soup powder with a mushroom flavor.

| | Parts by weight |
|---|---|
| Monosodium glutamate | 100 |
| Table salt | 86 |
| Ground black pepper | 0.8 |
| Ground celery seed | 1.7 |
| Tapioca flour | 6 |
| Powdered mushroom | 39 |
| Tumeric | 0.6 |

Any of the above powders may be dispersed in hot water, preferably in the proportion of 0.1 ounce of the powder to one cup of water, to produce a soup of the characteristics indicated. It is noted, however, that the resulting soup is not a thick soup. It is desirable to include in the base as much as 6% of dry powdered thickening ingredient to produce a soup-like consistency when the powder is mixed with water as above suggested.

It should be noted that a relatively large percentage of salt is essential to the complete soup base. In the illustrated formulas salt is present in 69% or 86% on the weight of the monosodium glutamate.

Having thus disclosed my invention and described in detail formulas illustrative of my invention, I claim as new and desire to secure by Letters Patent:

1. A dry powdered soup base comprising essentially and predominantly monosodium glutamate and a thickening agent, said materials being in such proportions and capable of being readily dissolved and dispersed in water to form a broth.

2. A powdered soup composition which on the addition of water becomes dispersed to form a broth, said composition having a basic soup-forming ingredient of mono-sodium glutamate, a thickening agent in proportion to the thickness desired in the broth and a flavoring ingredient.

3. A powdered soup composition which on the addition of water becomes dispersed to form a broth, said composition having a basic soup-forming ingredient of mono-sodium glutamate, a thickening agent in proportion to the thickness desired in the broth, a flavoring ingredient and seasoning.

4. A dry powdered composition which on the addition of water becomes dispersed to form a soup, said composition having a basic soup-forming ingredient of monosodium glutamate, a thickening agent in dry powdered form and in an amount approximating six to ten parts by weight of the monosodium glutamate, a flavoring ingredient and coloring matter.

5. A soup powder capable of being rapidly dispersed in hot water without requiring cooking or curing and comprising monosodium glutamate as a soup-forming ingredient in predominant percentage by weight, and containing in addition a thickening agent in dry powdered form and in an amount approximating six to ten parts by weight of the monosodium glutamate, and flavoring including salt, the salt being present in an amount approximating 69 to 86% by weight of the monosodium glutamate.

GUSTAVUS J. ESSELEN.

Disclaimer

Re. No. 22,978.—*Gustavus J. Esselen*, Swampscott, Mass. FOOD PRODUCT. Patent dated Mar. 2, 1948. Disclaimer filed Apr. 6, 1948, by the inventor.

Hereby disclaims from the scope of claims 1, 2, and 3 all dry powdered soup bases or compositions having a thickening agent present in an amount less than 6% by weight of the mono-sodium glutamate therein.

[*Official Gazette May 11, 1948.*]